United States Patent [19]

Barlage

[11] 4,235,294
[45] Nov. 25, 1980

[54] SOIL CULTIVATING MACHINE

[75] Inventor: Bruno Barlage, Riesenbeck, Fed. Rep. of Germany

[73] Assignee: H. Neimeyer Sohne GmbH & Co. KG, Riesenbeck, Fed. Rep. of Germany

[21] Appl. No.: 966,726

[22] Filed: Dec. 5, 1978

[30] Foreign Application Priority Data

Aug. 14, 1978 [DE] Fed. Rep. of Germany ....... 2835634

[51] Int. Cl.³ ............................................. A01B 33/00
[52] U.S. Cl. ..................................... 172/48; 172/97; 172/713
[58] Field of Search ................. 172/101, 102, 118, 96, 172/271, 48, 49, 57, 60, 53, 54, 84; 301/117; 403/263, 361

[56] References Cited

U.S. PATENT DOCUMENTS

| 785,504 | 3/1905 | Le Suer | 301/117 |
| 862,373 | 8/1907 | Appleby | 56/50 |
| 3,211,198 | 10/1965 | Glasgow | 403/361 |
| 4,033,418 | 7/1977 | Lely | 172/59 |
| 4,037,669 | 7/1977 | Lely | 172/713 |

FOREIGN PATENT DOCUMENTS 2206433 8/1973 Fed. Rep. of Germany ............. 172/53
2703221 8/1978 Fed. Rep. of Germany ........... 172/101

Primary Examiner—Richard J. Johnson
Attorney, Agent, or Firm—Sprung, Felfe, Horn, Lynch & Kramer

[57] ABSTRACT

A machine for cultivating the soil has a main transverse beam carrying a transverse tool shaft driven to drive wobble bearings on the tool shaft, thereby to oscillate a plurality of tool holders having lever arms guided for transverse swinging movement in the beam. The tool holders mount the tines directly in tapered bores in the tool holders. The tines are secured to the tool holders by bolts threaded into the upper ends of the tines and are provided with break sections, to protect the tool holders.

5 Claims, 3 Drawing Figures

SOIL CULTIVATING MACHINE

BACKGROUND OF THE INVENTION

The invention relates to a machine for cultivating the soil.

It is known to provide a soil cultivating machine having a main beam which can be attached to the conventional three point hydraulic system of an agricultural tractor so as to extend substantially horizontally and transversely with respect to the direction of travel, a tool shaft mounted parallel to, and with spacing below, the main beam, a plurality of wobble bearings disposed side by side, with spacing, on the tool shaft, and a plurality of tool holders, one supported on each of the wobble bearings, each of the tool holders carrying tines and comprising a lever arm guided for to-and-fro movement in a direction transverse to the direction of movement of the machine, when the tool shaft is driven, whereby the tines perform transverse pendulum movements.

In this known machine, the tool holders support the tines via intermediate, flat spring steel, inverted U-shape carriers the arms of which sweep to-and-fro over the surface of the ground with the result that they readily catch upon or strike stones above a certain size. Although the springing function of the carriers gives them some protection against the resulting blows, nevertheless, the carriers are not protected from permanent deformation or damage.

In the known machine, the tines themselves are provided at their upper ends with welded-on terminal plates which are fixed to the intermediate carrier arms by means of screws. These tines are comparatively expensive to produce. When selecting the material for the tines, its weldable capacity must be taken into consideration, with the result that, generally, only materials with limited wear-resistance can be used.

SUMMARY OF THE INVENTION

The present invention provides a machine for cultivating the soil comprising a main beam intended to extend substantially horizontally and transversely with respect to the direction of travel of the machine, a tool shaft mounted parallel to, and with spacing below, the main beam, a plurality of wobble bearings disposed side by side with spacing on the tool shaft, a plurality of tool holders, one supported on each of said wobble bearings, each of said tool holders comprising a lever arm guided for to-and-fro movement in a direction transverse to the direction of movement of the machine, the tool holders having bores which are open towards the bottom and taper upwardly, each of said tool holder bores receiving an upper, correspondingly upwardly tapered end portion of a tine, thereby to mount the tine in the bore, and a bolt is provided fixing each tine in its bore, the bolt engaging in a threaded bore in the upper end portion of the tine through the upper end of the tool holder bore.

In a machine in accordance with the invention, the tines are carried directly on the tool holders. A considerably larger passage is therefore provided between adjacent tool holders for stones present on the ground, so that the machine works more satisfactorily even under such unfavourable ground conditions. As a result of the absence of the intermediate carrier, together with the simplified construction of the tines and of the tine attachments, a considerable saving in weight and production costs may be achieved, while furthermore, the tines themselves can be made in one piece and from a material of the highest possible strength, which can be selected without regard to its welding capability. For example, spring steel can be used.

The upper end portion of each tine may have at least one locking projection located in a groove in the tool holder bore receiving the upper end portion.

A groove may be provided defining a predetermined breaking section immediately below the tapered upper end portion of each tine.

The safety notch enables a tine exposed to excessive loading to break so that the tool holder itself remains undamaged. The tine itself can be replaced rapidly and easily with low costs for spare parts.

A pair of said bores may be provided in each tool holder, the bores being disposed one behind the other in the direction of travel of the machine, the front bore in the direction of travel of the machine being situated in front of the tool shaft and the rear bore in the direction of travel of the machine being situated behind the tool shaft.

One of the two tool holder bores of each tool holder may be disposed at a greater distance from the tool shaft than the other.

Adjacent tool holders may have their front and rear bores respectively offset from one another in the direction of travel of the machine.

The advantages of these features will hereinafter become clear from a consideration of the following description of one specific embodiment of the present invention given by way of example, and not by way of limitation, with reference to the accompanying drawings in which:

DETAILED DESCRIPTION OF THE DRAWINGS

Figure 1:
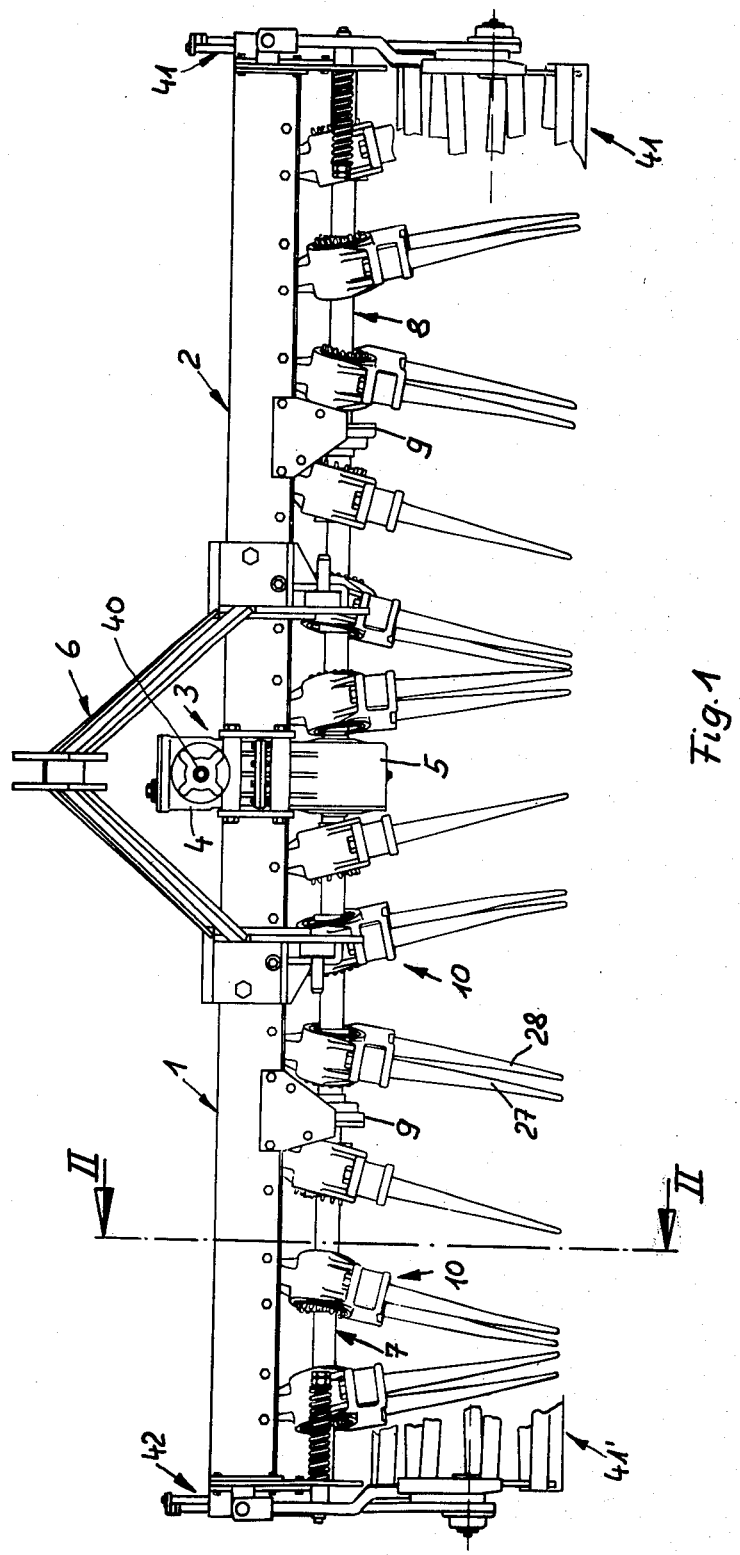
FIG. 1 is a diagrammatic general front view of a machine according to the present invention.

With reference now to the accompanying drawings, the machine comprises a main beam which extends substantially horizontally and transversely to the direction of travel, with spacing above a ground plane and which consists of two half portions 1, 2. Flange-mounted between the adjacent ends of the half portions 1, 2 of the main beam is a central gear box 3 which in turn consists of an upper gear box portion 4 and a lower gear box portion 5. The main beam 1, 2 is connected to a connecting frame 6 for attachment to the three-point hydraulic system of an agricultural tractor.

Disposed with spacing below and parallel to the main beam 1, 2 is a transverse tool shaft which in turn consists of two half portions 7, 8. The shaft half portions 7 and 8 are each mounted for rotation in outer bearings at their outer ends and in intermediate bearings 9 intermediate their ends and receive their rotary drive motion from the central gear box 3, to the lower gear box portion 5 of which the adjacent inner end portions of the shaft half portions 7, 8 are connected.

Tool units 10 are mounted side by side with spacing on the tool shaft 7, 8. These tool units each consist essentially of a tool carrier 11 of lever-like construction which is mounted on a wobble bearing 12 through which the tool shaft engages. Each tool holder 11 is a one-piece casting comprising an annular member 13 with an upwardly extending lever arm 14 and a downwardly extending foot portion 15.

Mounted for free rotation about a central spindle 17 at the free upper end of the lever arm 14 of the tool holder 11 is a guide roller 16 which is formed by the outer race of a ball bearing which is located with its inner race 18 on the lever arm 14. The outer surface of the guide roller 16 is part-spherical and rolls in a guide channel 19 and is formed in the underside of the main beam 1, 2. This guide channel 19 extends along the main beam parallel to, and centrally below, the tool driving shaft 7, 8. The opposite guide surfaces of the guide channel 19 are formed by inserts 20 which are replaceable as wearing parts.

The mutual spacing of the guide surfaces of the inserts 20 corresponds substantially to the maximum external diameter of the guide rollers 16 but exceeds this, however, by just such an extent that when the guide rollers 16 roll on the front or rear insert 20, transverse to the direction of travel 21, no jamming of the guide rollers occurs but instead, the rollers roll freely on the relevant guide surfaces.

The wobble bearings 12 each comprise a wobble bush 22 which is fixedly located on the tool shaft 7, 8 by means of attachment members 23. Each wobble bush has an oblique bore 24 to receive the tool shaft, but offers a cylindrical peripheral surface 25 which extends co-axially with spacing inside the inner surface of the annular member 13 of the tool holder 11. Between the peripheral surface 25 of the wobble bush 22 and the inner surface of the annular member 13 of the tool holder 11 is a taper-roller bearing 26. The transverse central plane 27 of the tool holder 11 extends perpendicular to the peripheral surface 25 of the wobble bush 22.

Figure 3:
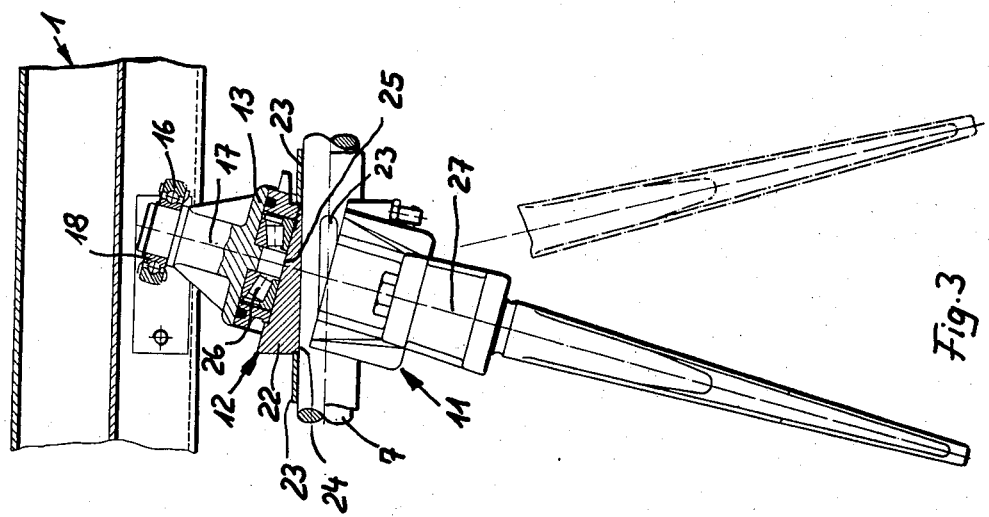
FIG. 3 shows a broken-away view in a partial section on line III—III in FIG. 2.

Although the tool units 10 are alike in construction, nevertheless, the wobble bushes 22 of adjacent tool units are offset at an angle to one another in the peripheral direction of the tool shaft. This results in the offset alignment of the transverse central planes 27 of the tool holders 11 as illustrated in FIG. 1. The machine is equipped with a total of twelve tool units. The angle of offset of the wobble bushes 22 is chosen so that on rotation of the half portions 7, 8 of the tool shaft, a kinetic balance of the moving tool units is achieved. When the machine is in operation, the tool units 10 execute a pendulum motion in a direction substantially transverse to the direction of travel 21 and during this pendulum motion the tips of tines 27, 28 secured to the underside of the tool holders 11 each travel round a closed curved path which is like an ellipse in plan view, the major axis of which is aligned parallel to the tool shaft and is comparatively large and the minor axis of which extends parallel to the direction of travel 21 and is comparatively small. As can be seen from FIG. 3, with the embodiment of the wobble bushes 22 illustrated, there is a maximum amplitude of pendulum motion transverse to the direction of travel which corresponds to the travel of the tine tips from the one end position illustrated in full lines to the other end position illustrated in broken lines in this Figure. This amplitude of pendulum motion is preferably adapted to the mutual spacing of the tool units 10 along the shaft 7, 8 so that the working passes of the tines 27, 28 of adjacent tool units 10 in the ground overlap one another or are at least contiguous so that all the ground is worked.

The tines 27, 28 are alike and consist of spring steel. The tines are individually forged in one piece. They are of curved configuration inasfar as they have an angled, lower tip region 29 which is directed either in the direction of travel 21 or directly counter to this, according to the mounting. In the first case, pulling of the tines into the ground is encouraged while in the latter case the pressing of ground vegetation into the soil is increased. Furthermore, each tine has an upper end portion which is constructed in the form of a head pin tapering upwards. The tapered head pin 30 has at least one radially projecting, integral locking projection 31. Each tine 27, 28 is secured direct to its tool holder 11. For this purpose, a foot portion 15 of the tool holder 11 comprises bores 32 which are provided in thickened regions thereof and which open towards the bottom, these bores tapering upwardly corresponding to the head pins 30 and having a groove or grooves to receive the locking projection(s) 31. The bores 32 are shouldered towards the top to present smaller diameter cylindrical bore portions 33 through which threaded shanks 34 of bolts 35 are introduced to secure the tines in the bore holders. The threaded shanks 34 are screwed into internally threaded bores 36 provided co-axially in the head pins 30 of the tines 27, 28. The head 37 of each bolt 35 rests on an upper supporting surface 38 of the tool holder 11 with the result that when the bolt 35 is tightened, the head pin 30 is positively and frictionally located in its bore 32. The locking projection(s) 31 form an additional securing means preventing rotation of the tines in the bores 32 and act also as an alignment aid when the head pin 30 is inserted in its bore 32.

Provided below the head pin 30 of each tine 27, 28 is a groove 39 which extends part way round or all round the tine and which defines a predetermined breaking section. The breaking force required to break the tine at the predetermined breaking section is adjusted by appropriate dimensioning of the groove 39 so that the tine can break off under a given loading. Broken tines can be replaced quickly and easily with spares.

Figure 2:
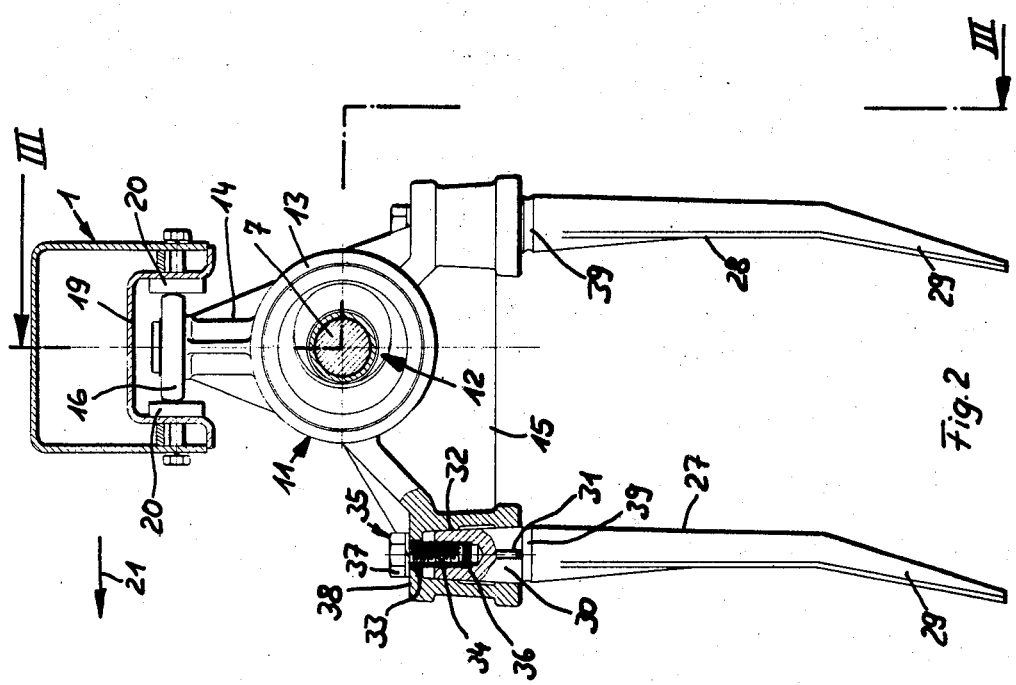
FIG. 2 is a view in a simplified section on line II—II in FIG. 1.

A pair of bores 32 is provided in each tool holder 11 and the bores are disposed one behind the other, with spacing, in the direction of travel 21, in the central plane 27 of each tool holder. The front bore 32 is situated below and in front of the tool shaft 7, 8 in the direction of travel 21 and the rear bore 32 is situated below and behind the tool shaft 7, 8 in the direction of travel 21, as best seen in FIG. 2. Adjacent tool holders 11 are mounted so that their front and rear bores respectively are offset from one another in the direction of travel.

The height of the machine with respect to the soil to be cultivated is adjusted by means of the three-point hydraulic system of the tractor from which the drive to the front driving shaft 40 of the central gear box 3 is also effected via a universally jointed shaft. The machine can, however, be supported directly on the ground by means of wheels or by means of a following levelling roller indicated at 41 in FIG. 1, which is supported from the ends of the main beam 1, 2 for adjustment in height through a servo drive 42, and which is mounted for free rotation about a horizontal shaft behind the tool units.

It will be understood that the specification and examples are illustrative but not limitative of the present invention and that other embodiments within the spirit and scope of the invention will suggest themselves to those skilled in the art.

What is claimed is:

1. A machine movable in a given direction of travel for cultivating the soil comprising a main beam extending substantially horizontally and transversely with respect to the direction of travel of the machine; a tool shaft mounted parallel to and spaced below the main beam; a plurality of wobble bearings disposed spaced apart side-by-side on the tool shaft; a plurality of tool holders each supported on one of said wobble bearings and each comprising an upwardly extending lever arm guided for to-and-fro movement by the associated wobble bearing in a direction transverse to the direction of travel, each tool holder having a pair of bores which open towards the bottom and taper upwardly, wherein, in each pair of bores, the bores are disposed one behind the other in the direction of travel of the machine, with one bore disposed at a greater distance from the tool shaft than the other, the front bore in the direction of travel of the machine being situated in front of the tool shaft and the rear bore in the direction of travel of the machine being situated behind the tool shaft and the wobble bearings of adjacent tool holders being respectively angularly offset from one another in the peripheral direction of shaft travel; a tine for each tool holder bore having an upwardly tapered end portion for insertion into the bore; and means for releasable fixing each tine in its bore comprising for each a threaded bore in the upper end portion of the tine, an aperture through the upper end of the tool holder and axially aligned with the threaded bore and a bolt received through the aperture and engageable in the threaded bore.

2. A machine as claimed in claim 1 in which each tine has one of a curved and angled shape with its tip directed one of forwardly and rearwardly with respect to the direction of travel of the machine.

3. A machine as claimed in claim 2 wherein the upper end portion of each tine has at least one locking projection and each tool holder bore has a corresponding groove receptive of one projection when the upper end portion of the tine is received therein.

4. A machine as claimed in claim 2 further comprising means defining a predetermined breaking section disposed immediately below the tapered upper end portion of each tine comprising a groove.

5. A machine as claimed in claim 4 in which the groove extends all around the tine.

UNITED STATES PATENT AND TRADEMARK OFFICE
CERTIFICATE OF CORRECTION

PATENT NO. : 4,235,294

DATED : November 25, 1980

INVENTOR(S) : Bruno Barlage

It is certified that error appears in the above—identified patent and that said Letters Patent is hereby corrected as shown below:

Title Page, Assignee should be --H. Niemeyer sohne GmbH & Co. KG--.

Signed and Sealed this

Twenty-eighth Day of July 1981

[SEAL]

Attest:

Attesting Officer

GERALD J. MOSSINGHOFF

Commissioner of Patents and Trademarks